United States Patent [19]
Hubbard

[11] Patent Number: 5,434,734
[45] Date of Patent: Jul. 18, 1995

[54] APPARATUS FOR REDUCING DISTORTION IN A TAPE RECORDER

[75] Inventor: L. Ron Hubbard, deceased, late of East Grinstead, United Kingdom, by Norman F. Starkey, Executor; Hollywood, CA.

[73] Assignee: Church of Spiritual Technology, Los Angeles, Calif.

[21] Appl. No.: 82,808

[22] Filed: Jun. 25, 1993

Related U.S. Application Data

[63] Continuation of Ser. No. 718,507, Apr. 2, 1985, abandoned.

[51] Int. Cl.⁶ ............................................. G11B 15/60
[52] U.S. Cl. ................................................. 360/130.21
[58] Field of Search ................................. 360/84–85, 360/130.2–130.33, 132, 90

[56] References Cited

U.S. PATENT DOCUMENTS

| | | | |
|---|---|---|---|
| 3,869,725 | 3/1975 | Dattilo | 360/130.21 |
| 3,879,751 | 4/1975 | Gimelli | 360/90 X |
| 3,881,186 | 4/1975 | Nakauchi | 360/90 |
| 4,011,592 | 3/1977 | Kawada | 360/132 |
| 4,276,575 | 6/1981 | Schoettle et al. | 360/130.21 |
| 4,383,285 | 5/1983 | Stoar | 360/132 |
| 4,509,087 | 4/1985 | Jäger et al. | 360/132 |
| 4,578,725 | 3/1986 | Muller | 360/85 |
| 4,625,252 | 11/1986 | Baly et al. | 360/130.21 |
| 4,667,261 | 5/1987 | Roos et al. | 360/130.21 |

FOREIGN PATENT DOCUMENTS

| | | | |
|---|---|---|---|
| 55-150169 | 11/1980 | Japan | 360/130.21 |
| 60-98549 | 6/1985 | Japan | 360/130.21 |

*Primary Examiner*—A. J. Heinz
*Attorney, Agent, or Firm*—Small Larkin & Kiddé

[57] ABSTRACT

An apparatus for reducing distortion during recording in a tape recorder of the type including a recording head which includes an electrically grounded, electrically conductive member in light contact with a coated surface of the recording tape provided adjacent the recording head. With this structure, excess electrons present on the coated surface of the tape after recording are removed.

5 Claims, 1 Drawing Sheet

APPARATUS FOR REDUCING DISTORTION IN A TAPE RECORDER

This is a Continuation of application Ser. No. 06/718,507 filed on Apr. 2, 1985 now abandoned.

BACKGROUND OF THE INVENTION

1. Field of the Invention

This invention relates to magnetic recording medium devices and more particularly to tape recorders and methods for reducing distortion during recording,

2. Prior Art

In the prior art, methods for reducing distortion in tape recording equipment have taken essentially three courses. The first course is related to increasing the frequency response of the recording and playback heads together with the frequency response of the associated amplifiers, The second course of action relates to making the tape transport system itself better so that the tape runs at a more constant speed without wow and flutter, The third course of action taken to reduce distortion relates to removing contaminants such as dust and static electricity from the tape before and during the time period when the tape is being played, Even with the above described improvements in the tape recorder, it has still been noticed that there is still some distortion present in the recorded signal,

SUMMARY OF THE INVENTION

The inventor has carefully considered the problems in reducing distortion in the signal recorded on magnetic tape. The inventor has theorized that the distortion is caused by excess electrons still floating on the coated side of the tape as it passes off of the recording head. Accordingly, it is a general object of the present invention to develop a means or apparatus for eliminating the excess electrons present on the tape directly after it has passed over the recording head.

It is another object of the present invention to provide an apparatus for reducing the distortion during recording in a tape recorder.

In keeping with the principles of the present invention the objects are accomplished by a unique apparatus for reducing the distortion during recording in a tape recorder of the type including a recording head. The apparatus includes an electrically conductive member in light contact with the coated surface of the recording tape. The electrically conductive member is electrically grounded and sweeps off the excess electrons present on the tape after the tape has passed over the recording head. The electrically conductive member is placed adjacent the recording head and by sweeping the excess electrons off of the tape reduces the distortion of the recorded signal.

BRIEF DESCRIPTION OF THE DRAWINGS

The above mentioned objects of the present invention will become more apparent with reference to the following description taken in conjunction with the accompanying drawings wherein like reference numerals denote like elements and in which.

DETAILED DESCRIPTION OF THE INVENTION

Figure 1:
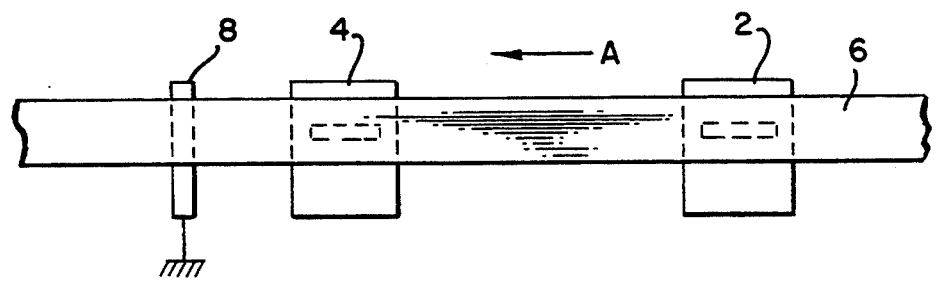
FIG. 1 is a front view of a portion of a tape recorder utilizing the teachings of the present invention.
Figure 2:
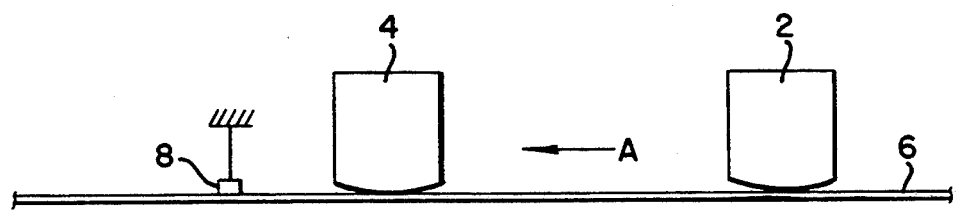
FIG. 2 is a top view of FIG. 1.
Figure 3:
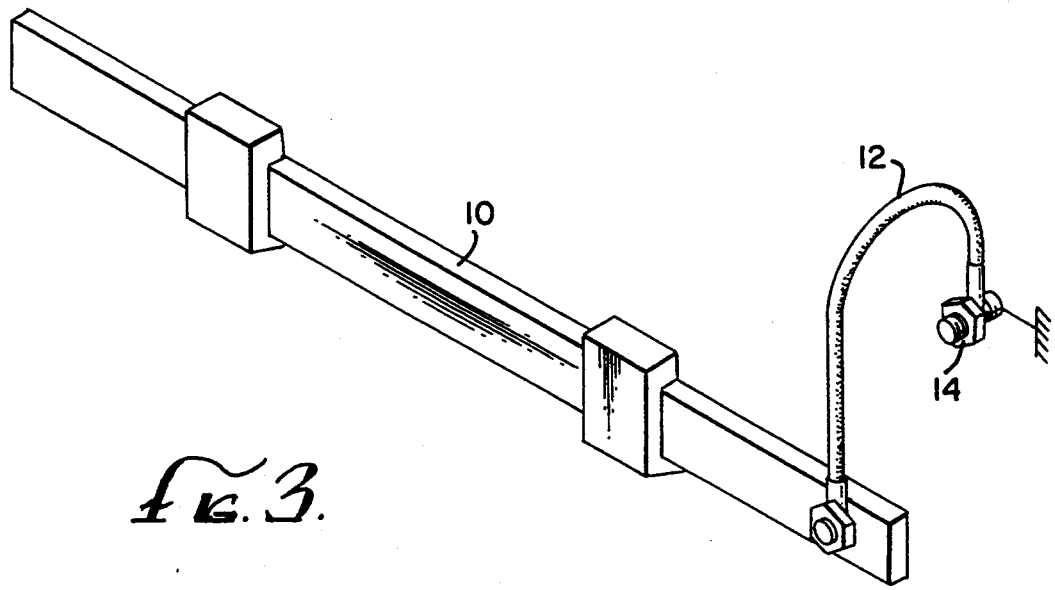
FIG. 3 is a perspective view of a tape lifter bar modified in accordance with the teachings of the present invention.

Referring to the FIGS. 1 and 2, shown therein are front and top views of a portion of a tape recorder modified in accordance with the teachings of the present invention. In the FIGS. 1 and 2, the tape recorder itself includes a playback head 2 and a recording head 4. In addition, a recording tape 6 passes over the playback and recording heads and moves in the direction indicated by the arrow A. After the tape 6 moves off of the recording head 4, the tape passes over an electrically conductive member 8 which is also electrically grounded. A suitable electrically conductive member which is electrically grounded is shown in FIG. 3. Shown in FIG. 3 is a tape lifter bar 10 which has been modified in accordance with the teachings of the present invention. As is common practice in the art of tape recorder design, a tape lifter bar is positioned in close proximity to a magnetic recording tape inserted into a tape recorder so as not to contact the tape during recording or playback, but to move the tape away from the magnetic head(s) of the tape recorder during fast forward or rewind so that the tape does not remain in contact with the head(s), thereby avoiding abrasive damage to the head(s) and tape. In particular the tape lifter bar 10 has been modified to include a grounding strap 12 which is connected between the tape lifter bar 10 and a grounding post 14 which could comprise a bolt or nut on the chassis of the tape recorder.

The electrically conductive member 8 is in light contact with a magnetic coating face 16 of the recording tape 6. In other words, the electrically conductive member 8 is in direct contact with the recording medium which is provided on the tape 6.

In operation, as the tape 6 passes over the recording head 4, a plurality of excess electrons are created on the magnetic coating face 16 of the tape 6 during the recording process. These excess electrons are present on the magnetic coating face 16 of the tape 6 and it is theorized that their movement causes some distortion in the signal recorded on the tape 6. As the tape 6 then passes over the electrically conductive member 8, Which is located adjacent and very close to the recording head 4, the excess electrons contained on the magnetic coating face 16 of the tape 6 are swept off of the tape 6 before any significant distortion of recorded signal occurs.

It should be apparent to those skilled in the art that the grounded electrically conductive member 8 may be any member in addition to the tape lifter bar 10 and could be provided separately. It should be further apparent to those skilled in the art that the electrically conductive member 8 must be very smooth and be made from a very durable material so that not only is the tape not damaged, but the electrically conductive member 8 is not easily worn or scratched.

It should be further apparent to those skilled in the art that the above described embodiment is illustrative of but one of many possible embodiments employing the principles of the present invention. Numerous and various other arrangements can be readily devised by those skilled in the art without departing from the spirit and scope of the invention.

I claim:

1. A magnetic tape recorder system comprising:
    a magnetic recording tape having a recording medium on one surface, a first end and a second end and a predetermined width;

a recording head adapted to record signals on the magnetic coating as the tape is passed over the head during recording;

a smooth, non-rotatable, electrically conductive, rectangularly cross-sectioned bar having a predetermined length which is greater than the width of said tape, a predetermined width and a predetermined thickness adapted for sweeping off excess electrons present on the tape after the tape has passed over the recording head;

an insulated, elecrically conductive wire attached at one of its ends to a side wall of said bar with a nut and screw at a position adjacent one end of said bar and attached at its other end to an electrically conductive, grounded component of said system.

2. The tape recorder system of claim 1 wherein the bar is placed adjacent the recording head.

3. The tape recorder system of claim 1 wherein the bar is grounded to the recorder system.

4. The tape recorder system of claim 1 wherein the bar is in direct physical contact with recording medium.

5. The tape recorder system of claim 1 whereby distortion of the recorded signal is reduced in comparison to distortion of the recorded signal of a tape not having the excess electrons swept off.

* * * * *